(12) United States Patent
Hui et al.

(10) Patent No.: US 7,445,720 B2
(45) Date of Patent: Nov. 4, 2008

(54) SALT CHLORINE GENERATOR

(75) Inventors: Joseph Hui, Lakewood, NJ (US); Richard Holstein, Lakewood, NJ (US)

(73) Assignee: Smartpool Incorporated, Lakewood, NJ (US)

(*) Notice: Subject to any disclaimer, the term of this patent is extended or adjusted under 35 U.S.C. 154(b) by 331 days.

(21) Appl. No.: 11/206,744

(22) Filed: Aug. 19, 2005

(65) Prior Publication Data

US 2006/0076282 A1   Apr. 13, 2006

Related U.S. Application Data

(60) Provisional application No. 60/602,879, filed on Aug. 20, 2004.

(51) Int. Cl.
*E04H 4/12*  (2006.01)
*C02F 1/461*  (2006.01)
*C25B 1/26*  (2006.01)

(52) U.S. Cl. .................. 210/748; 210/167.11; 210/232; 210/192; 210/416.2; 204/286.1

(58) Field of Classification Search .............. 210/748, 210/167.01, 167.1, 192, 416.1, 416.2, 232, 210/167.11; 204/286.1, 297.01

See application file for complete search history.

(56) References Cited

U.S. PATENT DOCUMENTS

| 4,097,356 | A |   | 6/1978 | Yates et al. |
| 4,992,156 | A |   | 2/1991 | Silveri et al. |
| 4,997,540 | A |   | 3/1991 | Howlett et al. |
| 5,580,438 | A |   | 12/1996 | Silveri et al. |
| 5,759,384 | A | * | 6/1998 | Silveri ........................ 205/743 |
| 7,014,753 | B2 | * | 3/2006 | Holstein et al. .............. 210/136 |
| 2007/0084770 | A1 | * | 4/2007 | Mikuski et al. ........... 210/167.1 |

* cited by examiner

*Primary Examiner*—Fred G. Prince
(74) *Attorney, Agent, or Firm*—Birch, Stewart, Kolasch & Birch, LLP

(57) ABSTRACT

A salt chlorine generator for use in conjunction with a swimming pool, spa, hot tub or large vessel of water includes a bracket for mounting a housing on a wall of a swimming pool, spa, hot tub or large vessel of water. The housing is releasable mounted relative to said bracket and contains a compartment wherein a halogen-producing electrode configuration is removably mounted relative to the compartment. A predetermined length of electrical cable is stored within the compartment for enabling the halogen producing electrode configuration to be selectively removed from said compartment for replacing, servicing or winterizing.

14 Claims, 7 Drawing Sheets

SALT CHLORINE GENERATOR

CROSS-REFERENCE TO RELATED APPLICATIONS

The present application claims priority under 35 USC 119 (e) to U.S. Provisional Application No. 60/602,879 filed on Aug. 20, 2004 the entire contents of which are hereby incorporated by reference.

BACKGROUND OF THE INVENTION

1. Field of the Invention

The present invention relates to a halogen producing electrolytic cell for chlorinating a swimming pool, spa, hot tub, fountain or other large vessel by positioning the unit on a wall inside the vessel to be chlorinated and permitting water to flow through the unit.

2. Description of Background Art

Disinfection of swimming pools, spas, hot tubs, fountains or other large vessels normally requires the circulation of water through a halogen type disinfectant or by halogen generated within a cell inserted into the plumbing of the filtration loop.

These halogen generation systems generally require 1) cutting or adding the generation cell to the filtration pipe loop or 2) attaching the cell to existing fittings within the body of water.

A common difficulty of the first type is the high cost and large size of the electrodes, which require extensive electronic monitoring equipment to ensure safety and proper disinfection. These systems require that the operation of the electrodes inside the cell coincide with the operation of the existing circulation pump. Sensors must be used to ensure circulation and to accommodate the entrapment of gases produced during the generating process. The second type of system requires the immersion of electrodes under the surface of the water either attached to the inside of the vessel wall or attached to an existing fitting inside the vessel. The difficulty with this embodiment is the necessity to insert wiring through the vessel wall and route wires through existing pool piping which precludes access to the wires for service or replacement and which makes it difficult to remove the electrodes plates for replacement, cleaning or winterizing.

SUMMARY OF THE INVENTION

The present invention is designed to permit a unit to be readily, removably mounted adjacent to a wall of a swimming pool, spa, hot tub, fountain or other large vessel for positioning an electrolytic cell that produces halogen disinfectants directly in the water while permitting the unit to be easily detached from the mounting bracket for replacement, cleaning or winterizing.

These and other objects of the present invention are achieved by a providing a halogen producing electrolytic cell in a housing that is removably mounted to a bracket positioned on the wall of a swimming pool, spa, hot tub, fountain or other large vessel. The bracket includes an electrical cable of a predetermined length to permit low voltage current to be supplied to the halogen producing electrolytic cell for generating chlorine. The housing includes an electric cable storage area to permit the predetermined length of cable to be stored in a convenient manner during normal use of the unit. The predetermined length of cable can be easily removed from the storage area in the unit for enabling an individual to remove the unit from the bracket for easily replacing, repairing or winterizing the unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
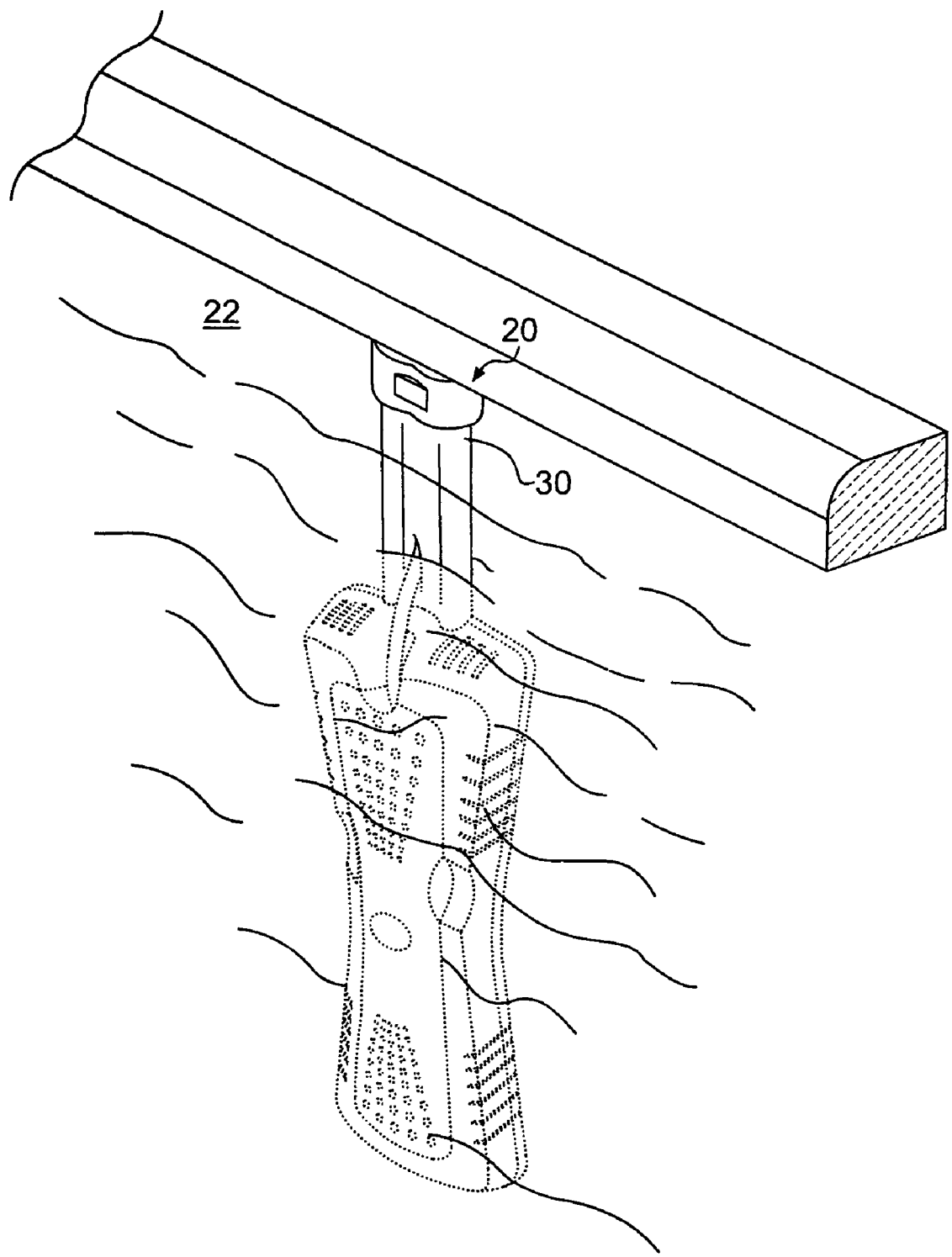
FIG. 1 is perspective view illustrating a housing for containing a halogen producing electrolytic cell mounted adjacent to a wall of a swimming pool.
Figure 3:
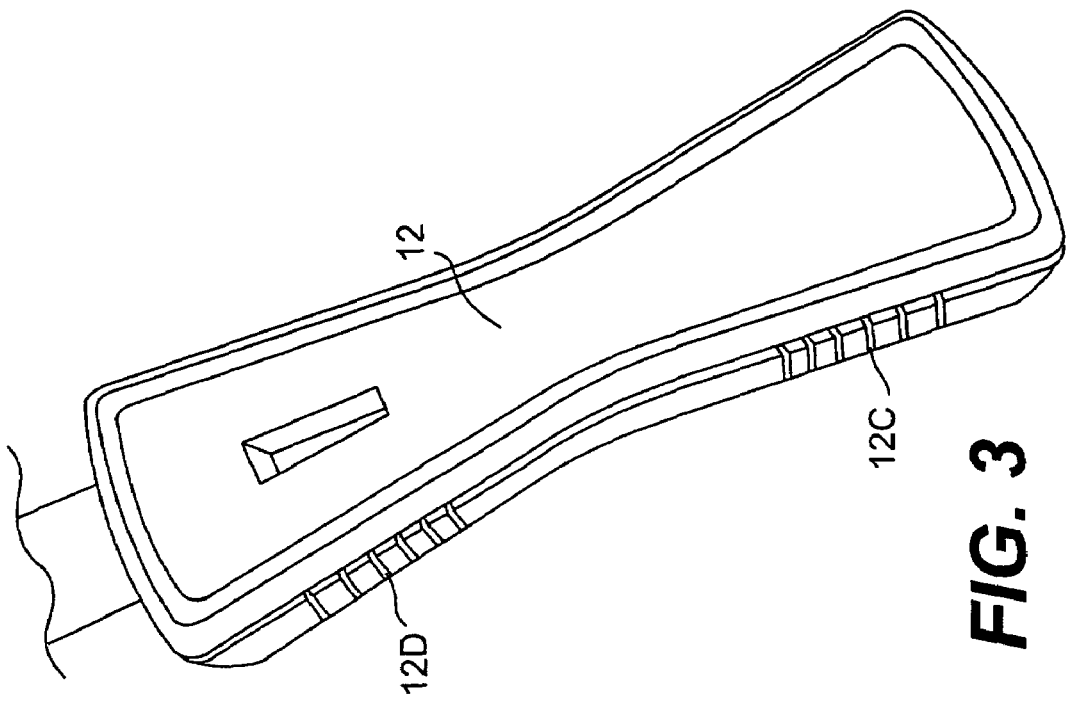
FIG. 3 is a rear perspective view illustrating the housing shown in FIG. 2.
Figure 2:
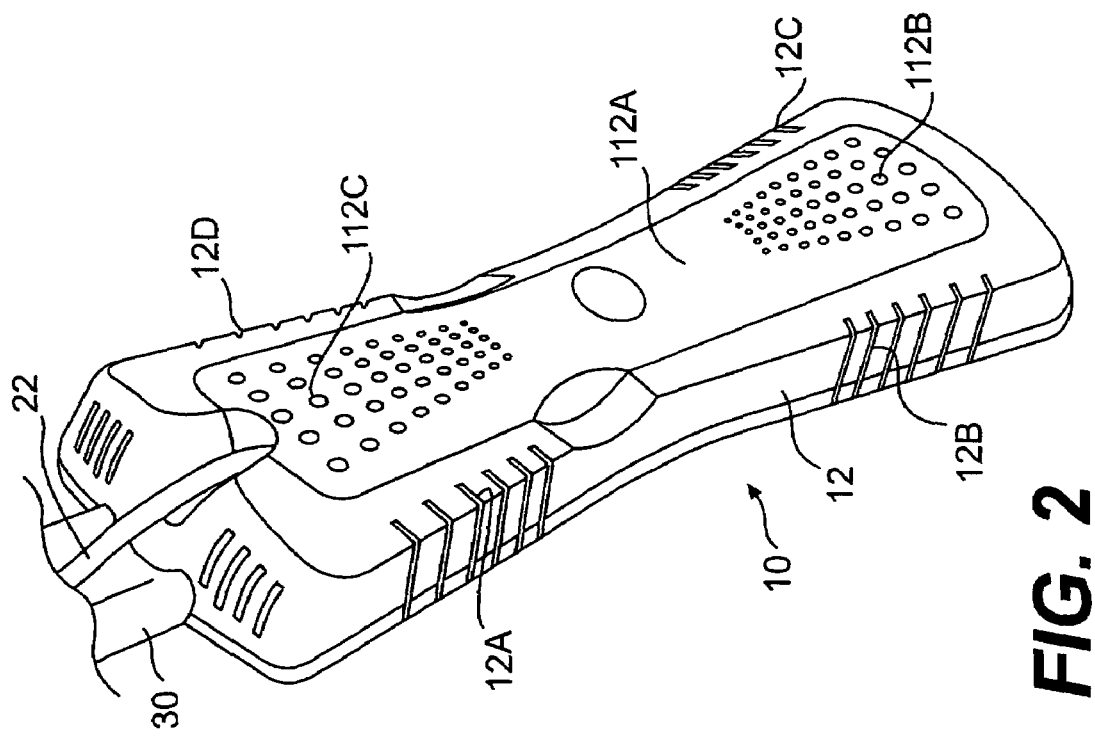
FIG. 2 is front perspective view illustrating a housing with a closure panel for closing the compartment for the halogen producing electrolytic cell mounted on the housing.
Figure 4:
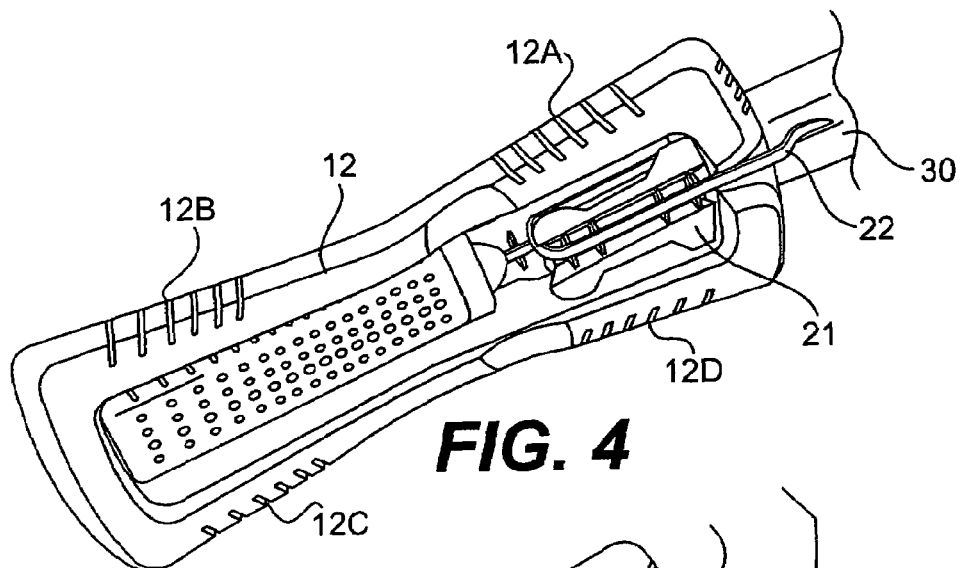
FIG. 4 is a front perspective view with the closure panel removed for illustrating the compartment for positioning the halogen producing electrolytic cell and the predetermined length of electrical cable.
Figure 5:
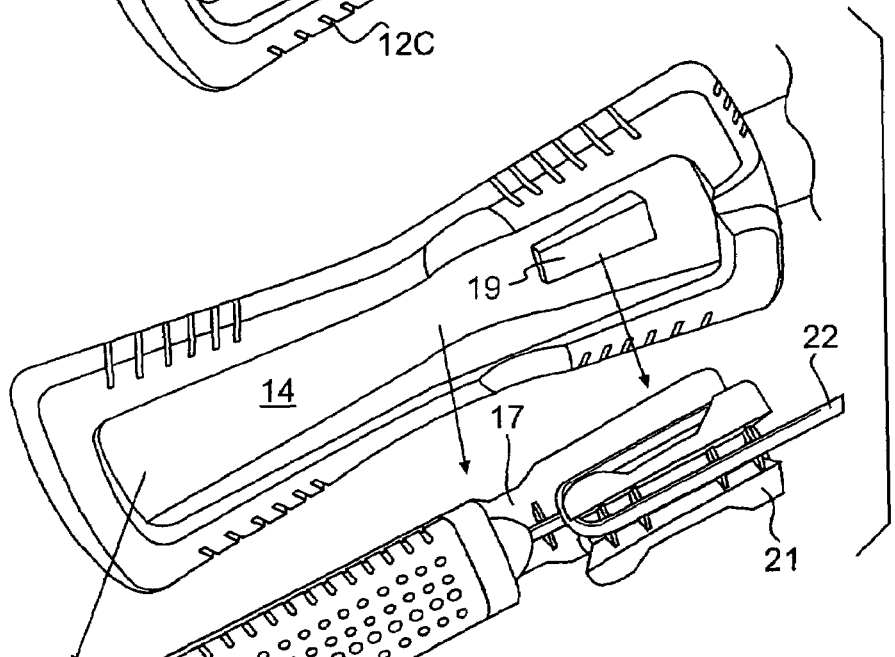
FIG. 5 is an exploded view illustrating the rear of the housing with the halogen producing electrolytic cell removed from the compartment for replacing, servicing or winterizing.
Figure 6:
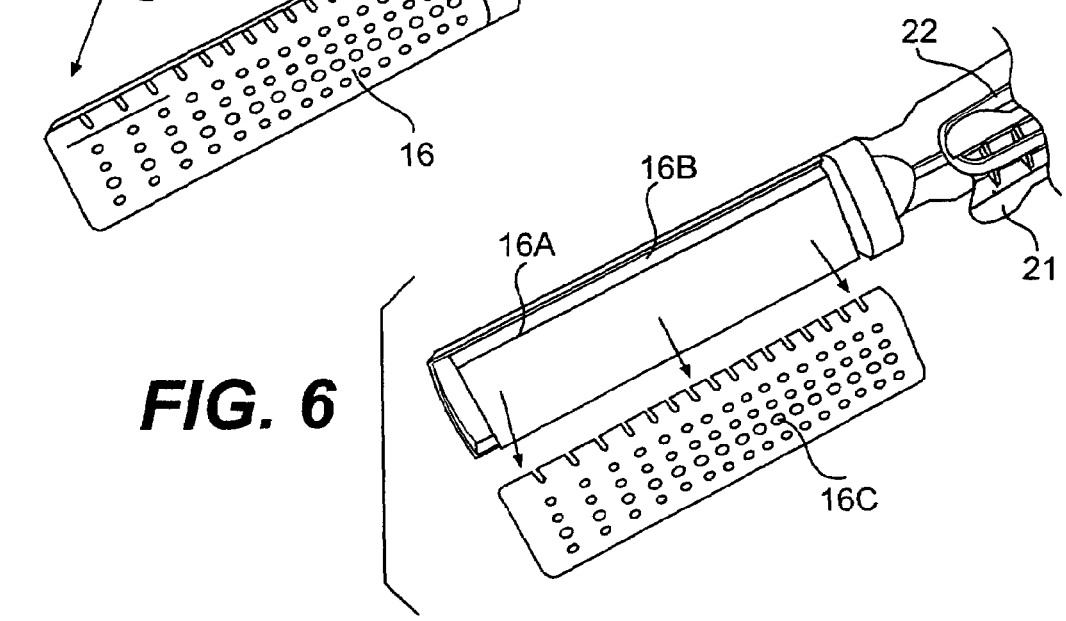
FIG. 6 is an exploded view of the halogen producing electrolytic cell with a cover removed for illustrating the plates that produce the electrolysis process.
Figure 7:
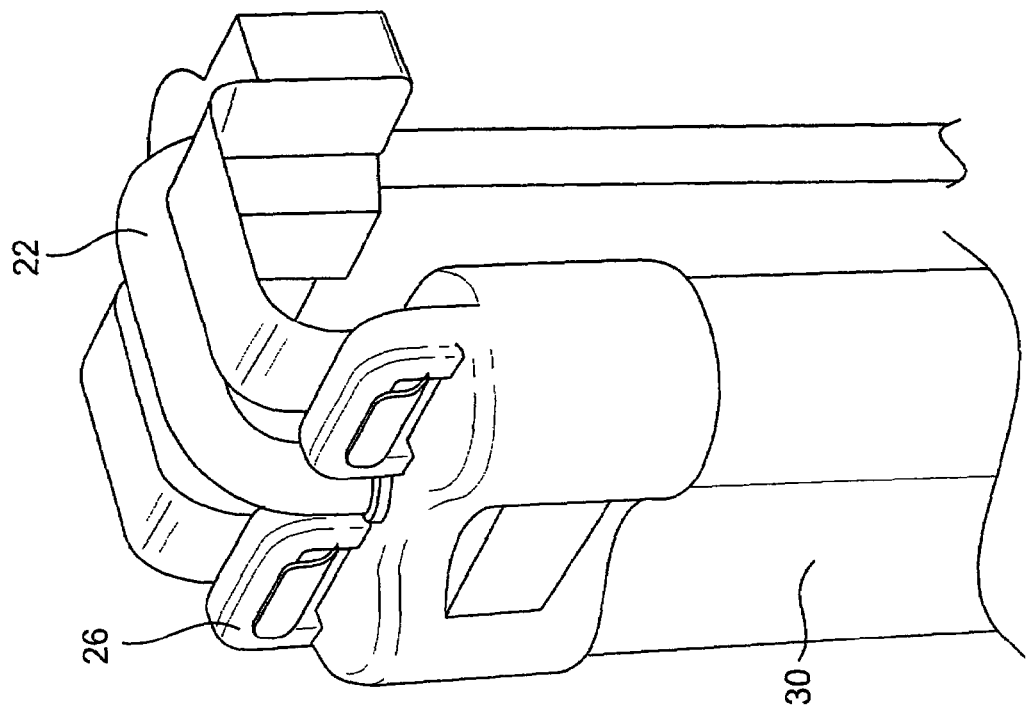
FIG. 7 is a front perspective view of the top of the unit as it is mounted to a wall bracket.
Figure 8:
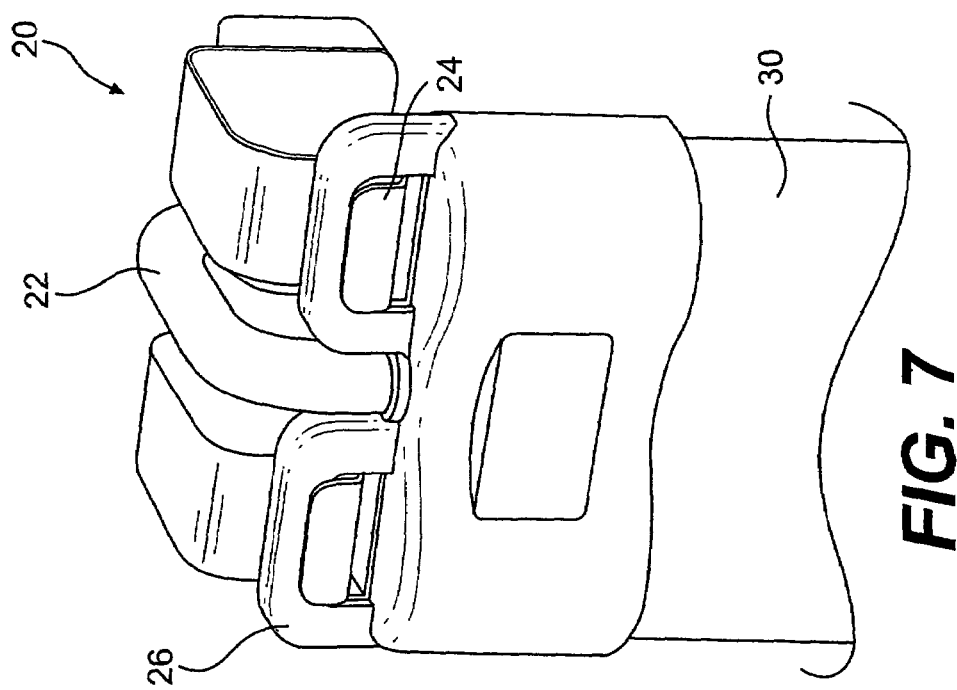
FIG. 8 a side perspective view of the top of the unit as it is mounted to the wall bracket.
Figure 9:
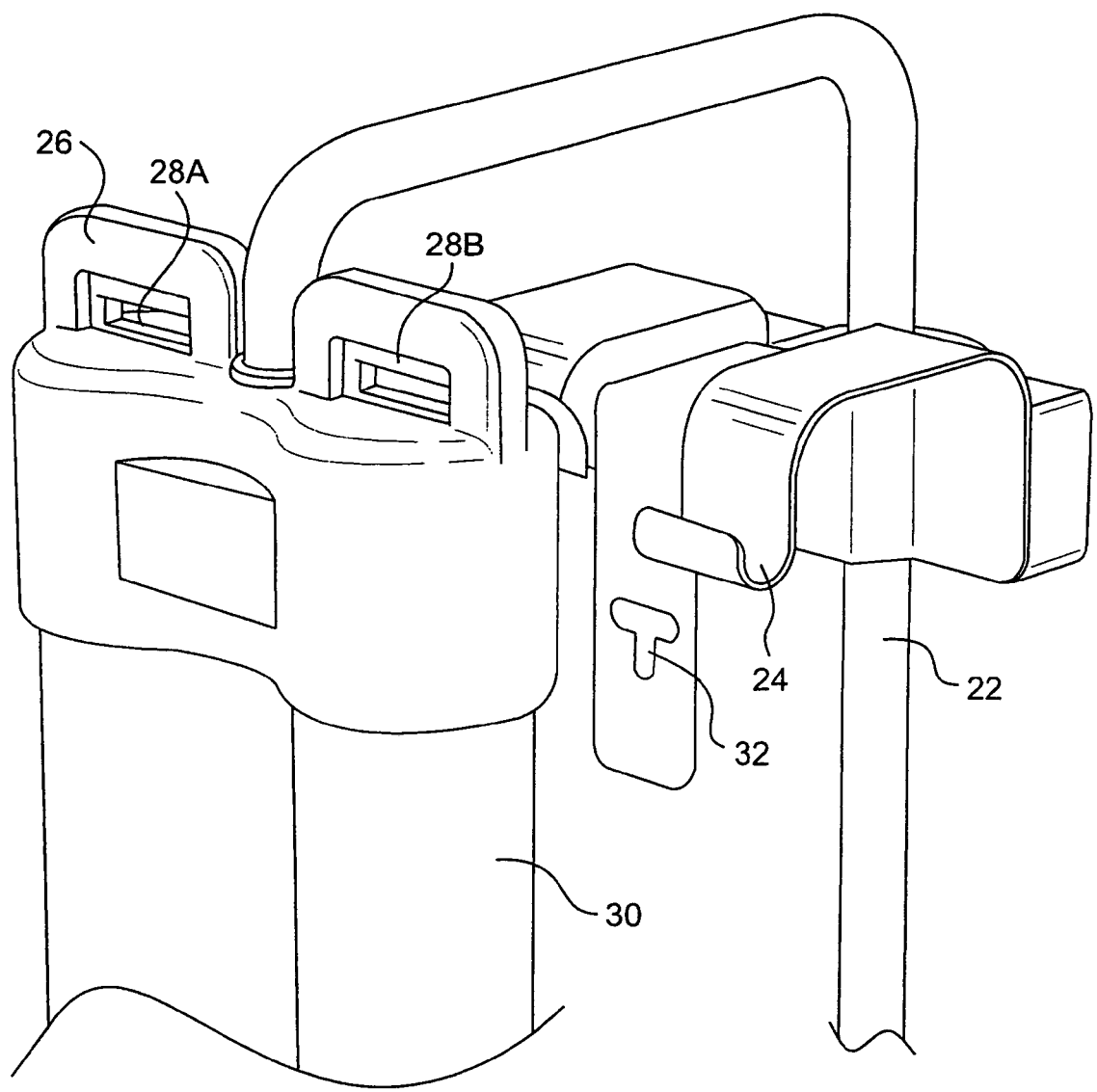
FIG. 9 is a perspective view of the top of the unit with the unit being disconnected from the wall bracket.

As illustrated in FIGS. 1-9, a salt chlorine generator 10 is designed for use in conjunction with a swimming pool, spa, hot tub or large vessel of water. A bracket 20 is adapted to be mounted on a wall 22 of a swimming pool, spa, hot tub or large vessel of water. A housing 12 contains a compartment 14 for positioning a halogen-producing electrode configuration 16. The halogen-producing electrode configuration 16 is removably mounted relative to said compartment 14 in the housing 12. The housing 12 is releasable mounted relative to the bracket 20. A predetermined length of electrical cable 22 is stored within the compartment 14 for enabling the halogen producing electrode configuration 16 to be selectively removed from the compartment 14 for replacing, servicing or winterizing.

The halogen producing electrode configuration 16 is positioned on a mounting member 17 that is received within the compartment 14. The mounting member 17 includes an aperture on the rear portion thereof for mating with a projection 19 disposed within the compartment 14 for securing the mounting member 17 within the compartment 14. A cable holder 21 is provided for storing the predetermined length of electrical cable 22 on said mounting member 17.

The halogen producing electrode configuration 16 includes electrical plates 16A, 16B for being supplied with power from the electrical cable 22 for causing an electrolysis process to occur. During the electrolysis process chlorine gas is produced which combines with the water to form sodium hypochlorite to sterilize the water. Hydrogen gas is also produced during the process which rises through the plurality of apertures 12A-12D in the housing 12 to produce convection currents for causing the water to circulate through the housing 12. In addition, a cover 16C is positioning on the mounting member 17 and for protecting the electrical plates 16A, 16B.

After the halogen-producing electrode configuration 16 is positioned within the compartment 14 in the housing 12 a cover 112A with a plurality of apertures 112B, 112C is mounted on the housing 12 for covering the halogen-producing electrode configuration 16 positioned within the compartment 14. In addition, as mentioned above, the housing 12 includes a plurality of apertures 12A-12D for permitting water to flow into the compartment 14 within the housing 12 for producing chlorine gas which combines with the water to form sodium hypochlorite.

The bracket 20 includes at least one holder 24 for releasable engaging a mounting projection 26 formed on an extension member 30 for mounting said housing 12 a predetermined distance below a water line in the swimming pool, spa, hot tub or large vessel. The bracket 20 further includes a locking member 32 formed on said bracket 20 and the housing for locking the bracket 20 and the extension member 30 for the housing 12 together during normal use of the salt chlorine generator 10.

The mounting projection 26 includes at least one aperture 28A, 28B for receiving the holder 24 for releasable positioning the housing 12 relative to the bracket 20.

The extension member 30 extends from the bracket 20 to conceal a portion of the predetermined length of electrical cable 22 and to mount the housing 12 at a predetermined distance below a water line in the swimming pool, spa, hot tub or large vessel of water.

Figure 10:
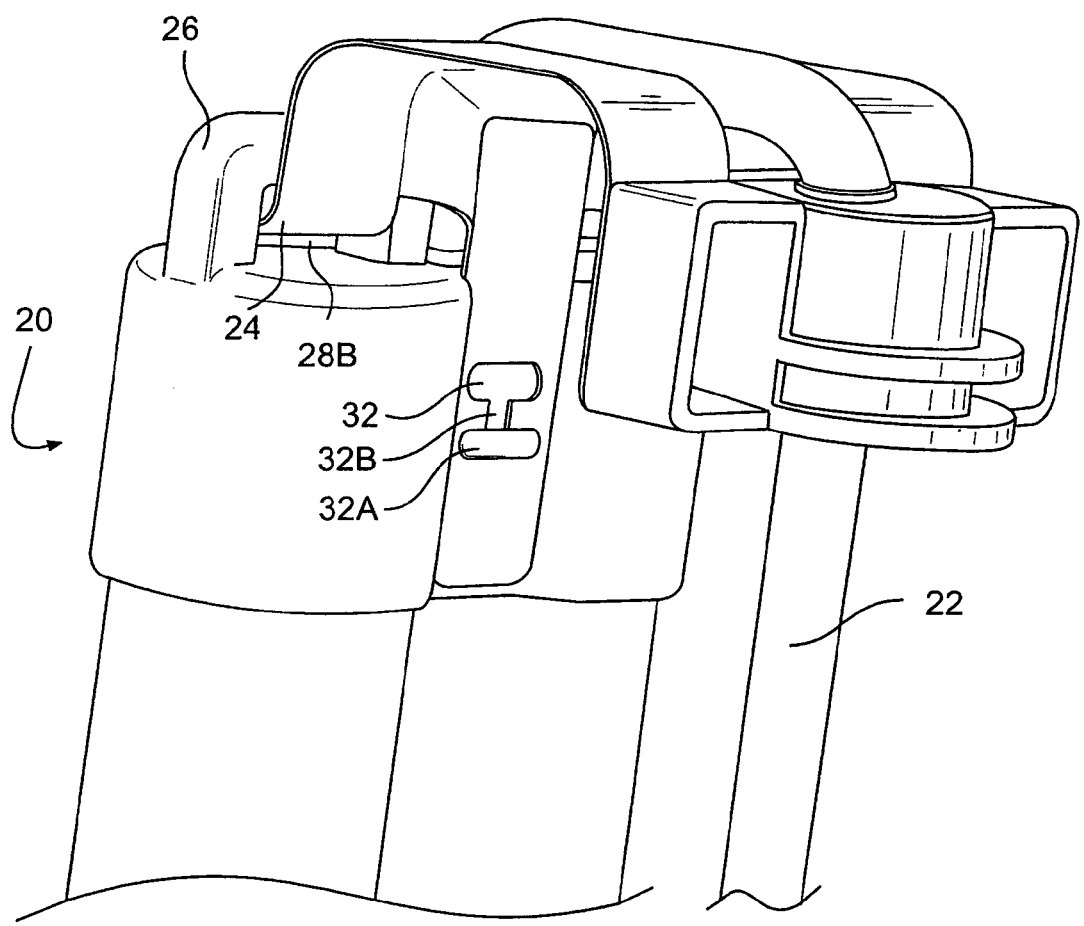
FIG. 10 is a rear perspective view of the top of the unit with the unit being connected to the wall bracket.

FIG. 10 illustrates a rear perspective view of the top of the unit wherein the bracket 20 includes a projection 32A formed on the bracket 20 for locking with an aperture 32 of the bracket 20. When the projection 32A is received within the slot 32B, the housing 12 is locked to the bracket 20. When the projection 32A is raised upwardly, the projection is able to be removed from the aperture 32 to permit replacing, repairing or winterizing of the unit.

Figure 11:
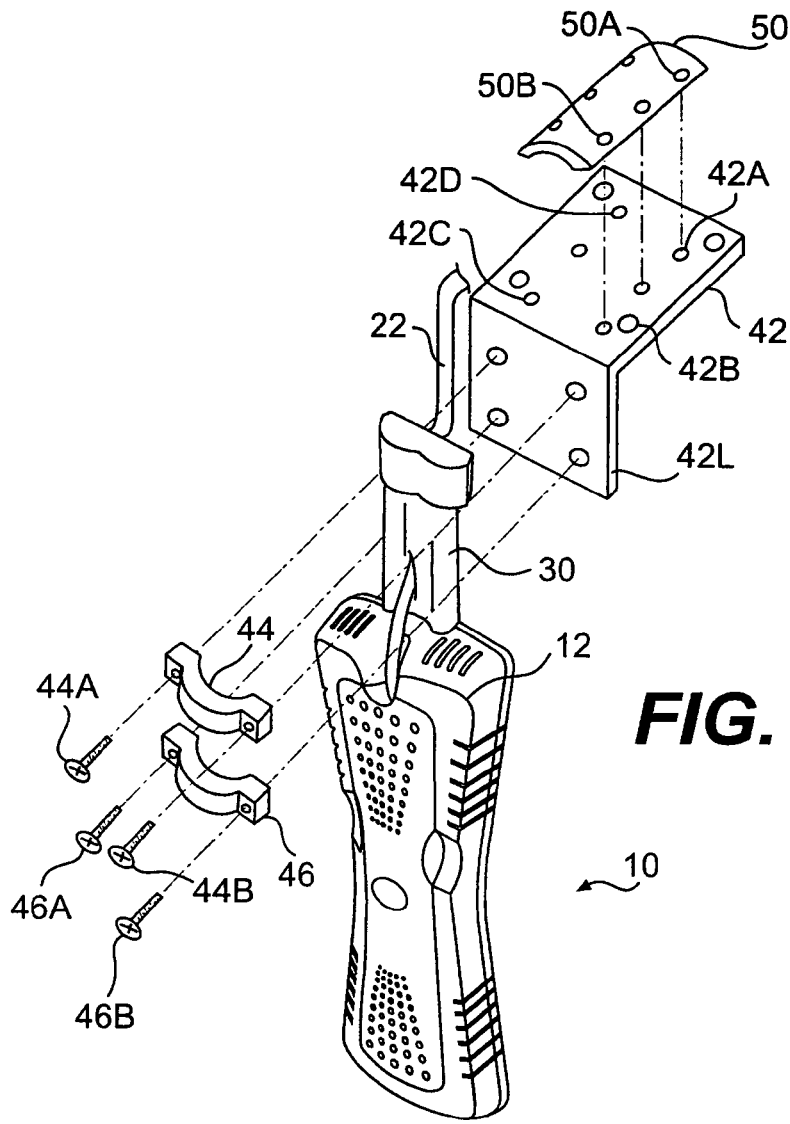
FIG. 11 is a perspective view of the salt chlorine generator mounted to an L-shaped bracket.
Figure 12:
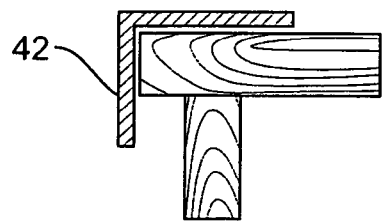
FIG. 12 is a side elevational view of the L-shaped bracket being mounted to a top portion of a wooden frame for the pool.
Figure 13:
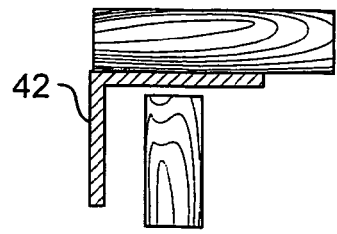
FIG. 13 is a side elevational view of the L-shaped bracket being mounted under the top portion of a wooden frame for the pool.

FIGS. 11-13 illustrate views of another embodiment wherein the salt chlorine generator 10 is mounted unto an L-shaped bracket 42. As illustrate in FIG. 11, the salt chlorine generator 10 includes the housing 12 with the extension member 30 which is a single tube that projects upwardly therefrom. The L-shaped bracket 42 is designed to be mounted on a deck adjacent to the pool or on a wooden frame for supporting the pool. Two brackets 44, 46 are provided for mounting the salt chlorine generator 10 unto the L-shaped bracket 42. Screws 44A, 44B, 46A and 46B are utilized for securing the brackets 44, 46 to the bottom portion 42L of the L-shaped bracket 42 with the single tube extension member 30 being disposed therebetween. An open channel 50 may be used for covering the electric cable 22 as it extends over the top portion of the L-shaped bracket 42. Apertures 50A, 50B mate with apertures 42A, 42B in the L-shaped bracket 42 for permitting screws to secure a first side of the open channel 50 to the L-shaped bracket 42. In addition, apertures 42C, 42D are provide in the L-shaped bracket 42 for mating with apertures (not illustrated) in the open channel 50 for securing a second side of the open channel 50 to the L-shaped bracket 42.

As illustrated in FIG. 12, the L-shaped bracket 42 may be secured to a top portion of a deck or wooden frame for the pool. As illustrated in FIG. 13, the L-shaped bracket 42 may be secured under the top portion of the deck or wooden frame for the pool. In the embodiment illustrated in FIG. 13, the electrical cable 22 is then disposed in a gap below the deck or wooden frame for the pool.

Low voltage power is provided to the electrodes through a transformer provided as part of the system. The system may be connected to an existing GFCI electrical outlet utilizing a common 3-prong plug or twist-lock plug commonly used around pools, spas, hot tubs, fountains or other vessels. If preferred, a licensed electrician can also make the electrical connection by connecting wires directly onto a GFCI circuit. A transformer is provided together with the system for producing low voltage for supplying power for operating the salt chlorine generator.

In operation, a suitable amount of sodium chloride is dissolved in the water. Thereafter, the water would enter the apertures 12A-12D in the housing 12 and the water would come into contact with the halogen producing electrolytic cell 16 for generating chlorine gas that combines with the water to form sodium hypochlorite which is supplied to the pool, spa or hot tub or other vessel. A continuous level of chlorine will be generated to ensure that the appropriate level of chlorine is present in the pool, spa or hot tub or other vessel without the need for turning on the pool or spa pump.

The halogen producing electrolytic cell 16 is supplied with a low voltage source of power of approximately 2-12V. A timer or other circuitry may be connected to the halogen producing electrolytic cell 16 to permit the unit to be periodically turned on and off or to adjust the level of output to the electrolytic cell.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A salt chlorine generator for use in conjunction with a swimming pool, spa, hot tub or large vessel of water comprising:

a bracket adapted to be mounted on a wall of a swimming pool, spa, hot tub or large vessel of water;

a housing containing a compartment, said housing being releasable mounted relative to said bracket;

a halogen-producing electrode configuration being removably mounted relative to said compartment in said housing; and a predetermined length of electrical cable being stored within said compartment for enabling said halogen producing electrode configuration to be selectively removed from said compartment for replacing, servicing or winterizing;

said halogen producing electrode configuration is positioned on a mounting member that is received within said compartment and said halogen producing electrode configuration includes electrical plates and further includes a cover for positioning on said mounting member and for protecting the electrical plates.

2. The salt chlorine generator for use in conjunction with a swimming pool, spa, hot tub or large vessel of water according to claim 1, wherein said mounting member includes a cable holder for storing the predetermined length of electrical cable on said mounting member.

3. The salt chlorine generator for use in conjunction with a swimming pool, spa, hot tub or large vessel of water according to claim 1, wherein said housing including a plurality of apertures for permitting water to flow into said compartment within said housing for producing chlorine gas which combines with the water to form sodium hypochlorite.

4. A salt chlorine generator for use in conjunction with a swimming pool, spa, hot tub or large vessel of water comprising:
- a bracket adapted to be mounted on a wall of a swimming pool, spa, hot tub or large vessel of water;
- a housing containing a compartment, said housing being releasable mounted relative to said bracket;
- a halogen-producing electrode configuration being removably mounted relative to said compartment in said housing; and
- a predetermined length of electrical cable being stored within said compartment for enabling said halogen producing electrode configuration to be selectively removed from said compartment for replacing, servicing or winterizing;
- wherein said halogen-producing electrode configuration is positioned within the compartment in the housing and a cover with a plurality of apertures is mounted on said housing for covering said halogen-producing electrode configuration positioned within said compartment.

5. A salt chlorine generator for use in conjunction with a swimming pool, spa, hot tub or large vessel of water comprising:
- a bracket adapted to be mounted on a wall of a swimming pool, spa, hot tub or large vessel of water;
- a housing containing a compartment, said housing being releasable mounted relative to said bracket;
- a halogen-producing electrode configuration being removably mounted relative to said compartment in said housing; and
- a predetermined length of electrical cable being stored within said compartment for enabling said halogen producing electrode configuration to be selectively removed from said compartment for replacing, servicing or winterizing;
- wherein said bracket includes at least one holder for releasable engaging a mounting projection formed on said housing and further including a locking member formed on said bracket and said housing for locking said bracket and housing together during normal use of said salt chlorine generator.

6. The salt chlorine generator for use in conjunction with a swimming pool, spa, hot tub or large vessel of water according to claim 5, wherein said mounting projection includes an aperture for receiving said holder for releasable positioning said housing relative to said bracket.

7. A salt chlorine generator for use in conjunction with a swimming pool, spa, hot tub or large vessel of water comprising:
- a bracket adapted to be mounted on a wall of a swimming pool, spa, hot tub or large vessel of water;
- a housing containing a compartment, said housing being releasable mounted relative to said bracket;
- a halogen-producing electrode configuration being removably mounted relative to said compartment in said housing;
- a predetermined length of electrical cable being stored within said compartment for enabling said halogen producing electrode configuration to be selectively removed from said compartment for replacing, servicing or winterizing; and
- an extension member for mounting said housing a predetermined distance below a water line in the swimming pool, spa, hot tub or large vessel of water.

8. The salt chlorine generator for use in conjunction with a swimming pool, spa, hot tub or large vessel of water according to claim 7, wherein said extension member extends from said bracket to conceal a portion of said predetermined length of electrical cable and to mount said housing at a predetermined distance below a water line in the swimming pool, spa, hot tub or large vessel of water.

9. A salt chlorine generator for use in conjunction with a swimming pool, spa, hot tub or large vessel of water comprising:
- an L-shaped bracket adapted to be mounted on a wall of a swimming pool, spa, hot tub or large vessel of water;
- a housing containing a compartment, said housing being releasable mounted relative to said L-shaped bracket;
- a halogen-producing electrode configuration being removably mounted relative to said compartment in said housing; and
- a predetermined length of electrical cable being stored within said compartment for enabling said halogen producing electrode configuration to be selectively removed from said compartment for replacing, servicing or winterizing;
- said halogen producing electrode configuration is positioned on a mounting member that is received within said compartment and said halogen producing electrode configuration includes electrical plates and further includes a cover for positioning on said mounting member and for protecting the electrical plates.

10. The salt chlorine generator for use in conjunction with a swimming pool, spa, hot tub or large vessel of water according to claim 9, wherein said mounting member includes a cable holder for storing the predetermined length of electrical cable on said mounting member.

11. The salt chlorine generator for use in conjunction with a swimming pool, spa, hot tub or large vessel of water according to claim 9, wherein said housing including a plurality of apertures for permitting water to flow into said compartment within said housing for producing chlorine gas which combines with the water to form sodium hypochlorite.

12. A salt chlorine generator for use in conjunction with a swimming pool, spa, hot tub or large vessel of water comprising:
- an L-shaped bracket adapted to be mounted on a wall of a swimming pool, spa, hot tub or large vessel of water;
- a housing containing a compartment, said housing being releasable mounted relative to said L-shaped bracket;
- a halogen-producing electrode configuration being removably mounted relative to said compartment in said housing; and a predetermined length of electrical cable being stored within said compartment for enabling said halogen producing electrode configuration to be selectively removed from said compartment for replacing, servicing or winterizing;

wherein said halogen-producing electrode configuration is positioned within the compartment in the housing and a cover with a plurality of apertures is mounted on said housing for covering said halogen-producing electrode configuration positioned within said compartment.

13. A salt chlorine generator for use in conjunction with a swimming pool, spa, hot tub or large vessel of water comprising:

an L-shaped bracket adapted to be mounted on a wall of a swimming pool, spa, hot tub or large vessel of water;

a housing containing a compartment, said housing being releasable mounted relative to said L-shaped bracket;

a halogen-producing electrode configuration being removably mounted relative to said compartment in said housing; and a predetermined length of electrical cable being stored within said compartment for enabling said halogen producing electrode configuration to be selectively removed from said compartment for replacing, servicing or winterizing;

at least one bracket for securing said salt chlorine generator to a downwardly extending portion of said L-shaped bracket.

14. A salt chlorine generator for use in conjunction with a swimming pool, spa, hot tub or large vessel of water comprising:

an L-shaped bracket adapted to be mounted on a wall of a swimming pool, spa, hot tub or large vessel of water;

a housing containing a compartment, said housing being releasable mounted relative to said L-shaped bracket;

a halogen-producing electrode configuration being removably mounted relative to said compartment in said housing;

a predetermined length of electrical cable being stored within said compartment for enabling said halogen producing electrode configuration to be selectively removed from said compartment for replacing, servicing or winterizing; and an extension member for mounting said housing a predetermined distance below a water line in the swimming pool, spa, hot tub or large vessel of water.

* * * * *